Aug. 6, 1968  H. C. SWIFT  3,395,780
CALIPER AND SUPPORT FOR A DISK BRAKE
Filed Oct. 13, 1966  2 Sheets-Sheet 1
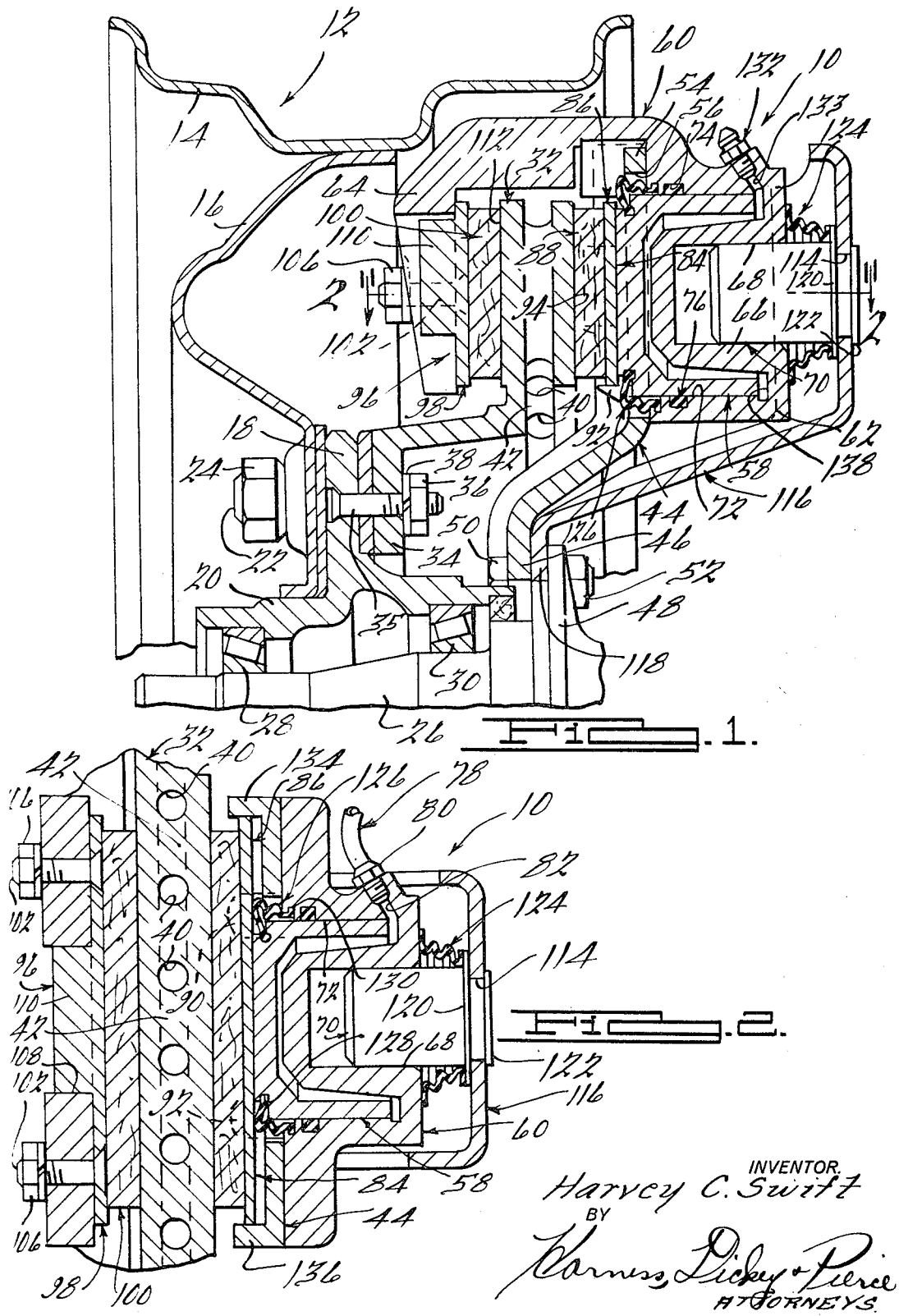
INVENTOR.
Harvey C. Swift
BY
Harness, Dickey & Pierce
ATTORNEYS.

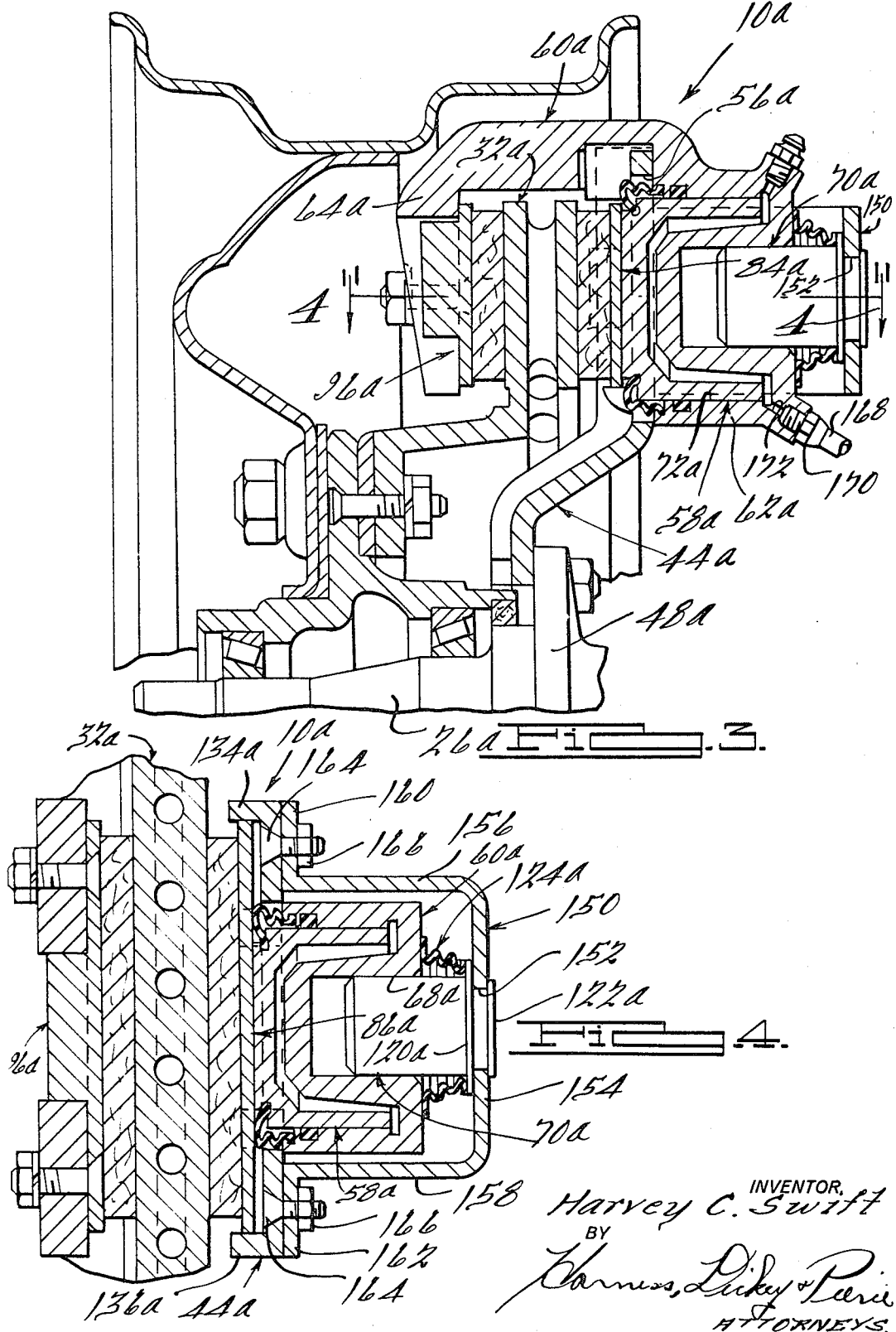

United States Patent Office 3,395,780
Patented Aug. 6, 1968

3,395,780
CALIPER AND SUPPORT FOR A DISC BRAKE
Harvey C. Swift, Birmingham, Mich., assignor to Kelsey-Hayes Company, Romulus, Mich., a corporation of Delaware
Filed Oct. 13, 1966, Ser. No. 586,563
7 Claims. (Cl. 188—73)

ABSTRACT OF THE DISCLOSURE

A disk brake construction comprising a rotor; first and second brake shoe means engageable with the opposite sides of the rotor; a caliper member supporting one of the brake shoe means for movement toward and away from the rotor; means defining a bore on the caliper member; piston means slidably disposed within the bore and engageable with the other of the brake shoe means for biasing the same toward the rotor; a stationary torque reaction member, and means including shaft means and means slidably engageable with the shaft means connecting the members, whereby an increase in fluid pressure in the bore results in the piston means being biased in one direction to engage one of the brake shoe means with the rotor and the caliper member being biased in the opposite direction to engage the other of the break shoe means with the rotor, the reaction torque developed upon engagement of the brake shoe means with the rotor being transmitted directly to the stationary torque reaction member at least partially through the means connecting the members.

---

This invention relates generally to braking devices for automotive vehicles and, more particularly, to a new and improved disk brake construction.

Generally speaking, the disk brake construction of the present invention is characterized by the provision of a pair of torque reaction arms, one of which has a stationary shaft mounted thereon that is adapted to be received within a complementary bore formed in one side of the brake caliper for reciprocal movement relative thereto. The brake caliper is provided with another bore within which a reciprocal piston is mounted, a pair of brake shoes being disposed one on the brake caliper and the other upon one face of said piston. Upon an increase in fluid pressure in the bore within which the piston is located, the piston will move one of the brake shoes into frictional engagement with the brake rotor, while the caliper will move relative to the aforesaid shaft to bias the other of the brake shoes into frictional engagement with the opposite side of the rotor, thereby effecting the desired braking action. The two torque reaction arms are adapted to absorb the reaction torque developed upon engagement of the brake shoes with the rotor, whereby to assure equal pressure which is applied thereby.

It is accordingly a general object of the present invention to provide a new and improved disk brake construction.

It is a more particular object of the present invention to provide a new and improved disk brake construction having improved torque reaction characteristics.

It is still a more particular object of the present invention to provide a new and improved disk brake construction with improved means for permitting the brake caliper and brake shoes to move at right angles to the plane of the brake rotor.

It is another object of the present invention to provide a disk brake construction of the above character wherein the brake caliper is slidably or reciprocably mounted on a shaft which is in turn secured to a stationary portion of the vehicle adjacent the associated vehicle wheel by means of one of a pair of torque reaction arms.

It is another object of the present invention to provide a new and improved disk brake construction which is adapted to apply substantially equal pressure to the brake shoes on the opposite sides of the associated brake rotor.

It is a further object of the present invention to provide a new and improved disk brake construction which is of a relatively simple design, is easy to assemble, economical to commercially manufacture, rugged in construction and reliable and efficient in use.

Other objects and advantages of the present invention will become apparent from the following detailed description, taken in conjunction with the accompanying drawings, wherein:

FIGURE 1 is a cross-sectional view of a portion of a disk brake construction in accordance with an exemplary embodiment of the present invention, as shown in operative association with a portion of a vehicle wheel;

FIGURE 2 is a cross-section view of a portion of the disk brake construction illustrated in FIGURE 1, as taken substantially along the line 2—2 thereof;

FIGURE 3 is a cross-sectional view similar to FIGURE 1, showing an alternate embodiment of the disk brake construction of the present invention; and FIGURE 4 is a cross-sectional view of a portion of a disk brake construction illustrated in FIGURE 3, as taken substantially along the line 4—4 thereof.

For convenience of description, the terms "axially outer," "axially inner" and words of similar import will have reference to the disk brake construction of the present invention illustrated in FIGURES 1 and 3, with the axially outer end of the brake being located at the left sides of these figures. Likewise, the terms "radially inner," "radially outer" and derivatives thereof will have reference to the geometric center of the brake construction of the present invention and to the various component parts thereof.

Referring now to FIGURES 1 and 2 of the drawings, a disk brake construction 10, in accordance with an exemplary embodiment of the present invention, is shown in operative association with a section of a vehicle wheel 12 having a rim portion 14 and a web portion 16 which is secured to a mounting flange 18 of a wheel hub 20 by means of suitable screws, bolts or the like 22 and nuts 24. The wheel hub 20 is rotatably supported upon a fixed wheel spindle or axle 26 by means of suitable axially spaced bearing means 28 and 30 in the usual manner. A conventional brake disk or rotor 32 is mounted for rotation about the axis of the wheel axle 26 by having a laterally offset flange section 34 thereof secured to the hub flange 18 by means of suitable screws, bolts or the like 35, nuts 36 and lock washers 38. As best seen in FIGURE 2, the brake rotor 32 is formed with a plurality of radially extending openings or apertures 40 separated by circumferentially spaced web portions 42, which portions 42 act as air conveying or fan means to supply cooling air through the openings 40 during rotational movement of the brake rotor 32.

A torque reaction member or spider 44 is fixedly mounted relative to vehicle wheel 12 by having a laterally offset, inner flange portion 46 secured to a flange 48 on the wheel spindle 26 by means of suitable screws, bolts or the like 50 and nuts 52. The spider 44 comprises an outer arm 54 which defines an opening 56. A generally cylindrical shaped piston member 58 has a portion thereof extending through the opening 56 and functions in a manner later to be described.

The brake construction 10 comprises a housing or caliper, generally designated 60, which has spaced dependent portions or legs 62 and 64 that embrace a portion of the brake rotor 32. The leg 62 is formed with a generally cup-shaped section 66 that defines a cylindrical bore 68 which extends parallel to the axis of the spindle 26, the cylindrical bore 68 being adapted to slidably or reciprocally receive a mounting stud or stub shaft 70, in a manner hereinafter to be described.

The portion of the caliper leg 62 circumjacent the cup-shaped section 66 defines a cylindrical bore 72 which slidably or reciprocally carries the piston 58, the bore 72 being formed with an annular recess 74 within which a suitable fluid seal 76 is disposed. As will be apparent, the piston 58 is adapted to move longitudinally of the caliper leg 62, i.e., axially of the rotor 32, under the force of pressurized fluid being introduced into the bore 72 due to energization of an associated master cylinder (not shown), which forces conventional brake fluid or the like, to the interior of the bore 72 through a suitable fluid conduit 78 which is communicable with the bore 72 by means of a fluid fitting 80 threadably mounted in the caliper 60 and a fluid passage 82 which extends between the fitting 80 and the interior of the bore 72, as seen in FIGURE 2.

A brake shoe 84 is disposed interjacent the axially outer side of the piston member 58 and the brake rotor 32 and includes a backing plate 86 and a brake lining 88 which is rigidly secured, as by bonding or riveting, to the backing plate 86 in the usual manner. The plate 86 is supported by means of a pair of ears 90 and 92 integral with the arm 54 of the spider 44, which plate 86 is engageable with the piston 58 so that left hand directional movement of said piston urges the brake lining 88 into frictional engagement with a radial braking face 94 of the rotor 32.

Another brake shoe 96 which includes a backing plate 98 having a brake lining 100 bonded or riveted thereto is fixedly secured to the caliper leg portion 64 by means of suitable screws, bolts or the like 102 and nuts 106. The caliper leg 64 may be centrally apertured, as seen at 108, to reduce the overall weight of the brake construction 10, and the brake shoe backing plate 98 may have an integral reinforcing portion 110 adapted to be received within the aperture 108. It will be seen that right hand directional movement of the caliper 60 will result in the brake lining 100 being biased into frictional engagement with a rotor face 112 opposite the face 94.

The stub shaft 70 which is partially received within the bore 68 of the caliper section 66 is rigidly secured at its axially inner end within a suitable opening 114 formed in a torque reaction arm 116. The arm 116 is rigidly secured relative to the wheel spindle 26 by having a laterally offset inner flange 118 thereof secured to the flange 48 by the bolts 50 and nuts 52. The shaft 70 is formed with a pair of enlarged diameter shoulder portions 120 and 122 disposed on the opposite sides of the arm 116 for rigidly securing the shaft thereto, the shoulder 122 being formed subsequent to assembly of the shaft 70 on the arm 116, as by crimping, swaging or the like. A suitable resilient or flexible dust cover 124 may be provided circumjacent one end of the bore 68, with one end thereof secured to the side of the caliper leg 62 and the other end thereof secured to the stub shaft 70 adjacent the shoulder 120. Such a cover 124 functions to prevent the ingress of any foreign materials such as moisture, dust, road dirt, and the like into the bore 68. A similar dust cover 126 may be provided circumjacent the bore 72 within which the piston 58 is reciprocally mounted, one end of the cover 126 being received within a suitable recess 128 in the end of the piston 58, while the other end of the cover 126 is received within a suitable recess 130 formed in the caliper leg 62 circumjacent the end of the bore 72. A suitable bleed fitting 132 is preferably provided on the caliper 60 and communicates through a fluid passage 133 with the interior of the bore 72.

In operation, upon energization of the aforementioned master cylinder, pressurized fluid is admitted into the bore 72 through the conduit 78, fitting 80 and fluid passage 82, resulting in the piston member 58 being biased toward the left in FIGURES 1 and 2, and thereby engaging the brake lining 88 with the rotor surface 94. Simultaneously, the caliper 60 will be biased toward the right in FIGURES 1 and 2, the caliper being slidably carried upon the shaft 70, with the result that the brake lining 100 is biased into frictional engagement with the rotor surface 112. As will be apparent, as the brake linings 88 and 100 compressingly and frictionally engage the brake rotor 32, rotation of the vehicle wheel 12 will slow down or stop. Upon relieving the fluid pressure within the bore 72, the biasing force on the piston 58 and caliper 60 will be relieved and the rotor 32 will be released.

As the brake linings 88 and 100 are forced into frictional engagement with the rotor surfaces 94 and 112, respectively, a considerable amount of torque is developed which tends to bias the two brake shoes 84 and 96 in the direction in which the rotor 32 is turning. The torque on the brake shoe 84 is absorbed directly by the arm 54 due to the fact that the backing plate 86 is confined between a pair of right angle flange portions 134 and 136 formed at the sides of the arm 54 (see FIGURE 2). The torque on the brake shoe 96, however, is transmitted directly to the caliper 60 which is in turn transmitted to the shaft 70 upon which the caliper 60 is carried. The torque forces on the shaft 70 are in turn absorbed by the arm 116 which is fixedly secured, along with the arm 54, to the wheel flange 48. It will be seen that the piston 58 is entirely free of any torque reaction and, therefore, its movement within the bore 72 remains unimpeded at all times.

It will be appreciated that a considerably greater force is required to apply the brake shoe 96 than is needed to apply the shoe 84, due to the fact that the caliper 60 is of somewhat greater mass than the piston 58. Fluid pressure within the bore 72 acts on the piston 58 over an area equal to its cross section; however, this same fluid pressure acts on the caliper 60 over an area somewhat greater than the area of the piston due to an outwardly extending surface 138 formed around the end of the bore 72. The differential between the forces acting on the caliper 60 and on the piston 58 is proportional to the cross sectional area of the surface 138 so that by careful dimensional selection, the difference in energizing forces acting on the brake shoes 84 and 96 can be substantially reduced or eliminated. This, of course, is very desirable since it promotes more even wear on the brake linings 88 and 100.

Referring now to FIGURES 3 and 4, a slightly modified embodiment of the disk brake construction of the present invention is generally designated at 10a and comprises a caliper 60a having leg portions 62a and 64a, the latter of which is provided with a brake shoe 96a, and the former of which includes a piston 58a which is reciprocatable within a suitable bore 72a. A brake shoe 84a is adapted to be engaged by the piston 58a to apply a braking force along with the brake shoe 96a to an associated brake rotor 32a. The piston 58a extends through an opening 56a in a torque reaction arm 44a which is fixedly secured to a flange 48a of an associated wheel spindle 26a. All of the above component parts of the disk brake mechanism 10a are adapted to be substantially identical in construction and function to analogous parts designated by like numerals in the aforedescribed disk brake construction 10 shown in FIGURES 1 and 2.

As in the above described brake construction 10, the caliper 60a is adapted to be carried by a stub shaft 70a which functions to absorb the torque reactions force of the brake shoe 96a in the above described manner. As best seen in FIGURE 4, the shaft 70a is mounted on a generally C-shaped mounting bracket 150 by having its inner end extend through a suitable opening or aperture 152 formed in a medial section 154 of the bracket 150. Suitable retaining shoulders 120a and 122a may be formed on the shaft 70a to fixedly secure the same to the bracket 150. A suitable dust shield 124a may be provided on the shaft 70a and caliper leg 62a to prevent the influx of any dirt or foreign material into the bore 68a of the caliper 60a. The mounting bracket 150 comprises a pair of spaced parallel side sections 156 and 158 which terminate in outwardly extending portions 160 and 162, respectively, adapted to be rigidly secured to the torque reaction arm 44a at the opposite sides thereof by means of suitable screws, bolts or the like 164 and nuts 166.

It will be seen that upon energization of the associated master brake cylinder (not shown), fluid will be introduced into the interior of the bore 72a through a suitable fluid conduit 168 secured to the caliper 60a by a fluid fitting 170 and communicable with the bore 72a through a fluid passage 172. As described in connection with the brake construction of FIGURES 1 and 2, an increase in fluid pressure within the bore 72a will result in left-hand movement of the piston 58a, with the result that the brake shoe 84a will frictionally engage one side of the rotor 32a. Simultaneously, the caliper 60a will move toward the right, thereby frictionally engaging the brake shoe 96a with the opposite side of the rotor 32a. As the brake shoes 84a and 96a are pressed into frictional engagement with the rotor 32a, the torque reaction force being developed by the brake shoe 84a being absorbed directly by the arm 44a, as was the case in the above described brake construction 10; however, instead of the torque reaction force developed by the brake shoe 96a being transmitted through the caliper 60a, shaft 70a and arm 116, to the wheel flange 48, as was the case in the brake 10, the torque transmitted to the shaft 70a is transmitted through the mounting bracket 150 to the reaction arm 44a. It will be seen, therefore, that the torque reaction force developed by both of the brake shoes 84a and 96a will be transmitted directly to the single reaction arm 44a; in the case of the brake shoe 84a, through the backing plate 86a and flanges 134a and 136a, and in the case of the brake shoe 96a, through the caliper 60a, shaft 70a and mounting bracket 150. Accordingly, it will be seen that in this embodiment of the brake construction of the present invention, as well as in the earlier described embodiment, the piston 58a is entirely free of any torque reaction and, therefore, its movement relative to caliper 60a remains unimpeded at all times.

What is claimed is:
1. In a disk brake construction for use with a rotor,
first and second brake shoe means engageable with the opposite sides of the rotor,
a caliper member supporting one of said brake shoe means for movement toward and away from the rotor,
means defining first and second bores on said caliper member, said first bore being substantially coextensive of and spaced radially outwardly from said second bore,
piston means slidably disposed within said first bore and engageable with the other of said brake shoe means for biasing the same toward the rotor,
a stationary torque reaction member, and
shaft means secured to said torque reaction member and slidably received within said second bore for transmitting torque reaction forces from said caliper member to said torque reaction member, whereby an increase in fluid pressure in said first bore results in said piston means being biased in one direction to engage one of said brake shoe means with the rotor and said caliper member being biased in the opposite direction to engage the other of said brake shoe means with the rotor, with at least a portion of the reaction torque developed upon engagement of said brake shoe means with the rotor being transmitted directly to said torque reaction member.

2. A disk brake as defined in claim 1 wherein said torque reaction member comprises arm means connected to one of said brake shoe means.

3. A disk brake as defined in claim 1 wherein said torque reaction member comprises first arm means adapted to absorb the torque reaction force from one of said brake shoe means and second arm means adapted to absorb the torque reaction force from the other of said brake shoe means.

4. A disk brake as defined in claim 1 wherein said torque reaction member comprises a single stationary arm and said shaft means is secured to said arm.

5. A disk brake as defined in claim 1 wherein said torque reaction member comprises a stationary arm and wherein said piston means extends through an opening in said arm.

6. A disk brake as defined in claim 1 wherein said first bore has an end wall of a greater cross-sectional area than the cross section area of said piston means.

7. A disk brake as defined in claim 1 wherein said stationary torque reaction member comprises first and second sections, wherein said first section is operatively secured to said first brake shoe, and wherein said second section is operatively secured to said shaft means.

References Cited
UNITED STATES PATENTS

| 3,166,156 | 1/1965 | Burnett et al. | 188—73 |
| 3,166,159 | 1/1965 | Burnett | 188—73 |

FOREIGN PATENTS

| 1,273,257 | 8/1961 | France. |
| 1,072,115 | 12/1959 | Germany. |
| 1,154,313 | 9/1963 | Germany. |

MILTON BUCHLER, *Primary Examiner.*

GEORGE E. A. HALVOSA, FERGUS S. MIDDLETON, *Examiners.*